(12) United States Patent
Abdella et al.

(10) Patent No.: US 11,878,613 B2
(45) Date of Patent: Jan. 23, 2024

(54) RETENTION CLIP FOR A SEAT ASSEMBLY AND METHOD OF ASSEMBLY

(71) Applicant: Lear Corporation, Southfield, MI (US)

(72) Inventors: David Abdella, Southfield, MI (US); Joshua Hallock, Southfield, MI (US); Lisa Swikoski, Southfield, MI (US); Sam Blair, Southfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/724,866

(22) Filed: Apr. 20, 2022

(65) Prior Publication Data

US 2023/0339374 A1 Oct. 26, 2023

(51) Int. Cl.
*B62D 65/14* (2006.01)
*B60N 2/72* (2006.01)
*F16B 21/07* (2006.01)
*B60N 2/58* (2006.01)

(52) U.S. Cl.
CPC .................................. *B60N 2/5825* (2013.01)

(58) Field of Classification Search
CPC ...... B60N 2/5825; B60N 2/5833; B60N 2/58; B60N 2/5841; B60N 2/6027; A47C 31/023; Y10T 24/30
See application file for complete search history.

(56) References Cited

U.S. PATENT DOCUMENTS

| | | | | |
|---|---|---|---|---|
| 2,559,732 A | * | 7/1951 | Padgett | B64F 1/12 52/157 |
| 5,626,613 A | * | 5/1997 | Schmieding | A61B 17/0401 606/232 |
| 5,666,760 A | * | 9/1997 | Bramblett | A01K 91/04 43/42.49 |
| 5,840,078 A | * | 11/1998 | Yerys | A61F 2/0811 411/184 |
| 7,048,338 B2 | * | 5/2006 | Pinkos | B60N 2/002 297/180.12 |
| 7,264,309 B2 | * | 9/2007 | Pinkos | B60N 2/002 297/217.2 |
| 7,287,305 B2 | * | 10/2007 | Bednarski | B60N 2/5825 24/297 |
| 8,191,971 B2 | | 6/2012 | Lovasz | |
| 8,240,759 B2 | | 8/2012 | Hobl et al. | |
| 8,495,802 B2 | * | 7/2013 | Okada | B60R 13/0206 24/453 |
| 8,998,310 B2 | | 4/2015 | Lovasz et al. | |

(Continued)

FOREIGN PATENT DOCUMENTS

KR 200191119 Y1 * 3/2000 ............. F16B 35/00

OTHER PUBLICATIONS

International Search Report and Written Opinion of the International Searching Authority for corresponding international application No. PCT/US2023/014619, dated Apr. 14, 2023, 8 pages.

*Primary Examiner* — Shin H Kim

(74) *Attorney, Agent, or Firm* — Carlson, Gaskey & Olds, P.C.

(57) ABSTRACT

A retention clip, a seat assembly having a retention clip, and a method of assembly. The retention clip has a spiral anchor and at least one retention feature. The spiral anchor is configured to be screwed into a cushion. The retention feature extends away from the spiral anchor and is configured to secure a seat component to the retention clip.

19 Claims, 6 Drawing Sheets

(56) References Cited

U.S. PATENT DOCUMENTS

| | | | |
|---|---|---|---|
| 9,199,564 B2 | 12/2015 | Clauser et al. | |
| 10,251,635 B2 | 4/2019 | Khairkhahan et al. | |
| 10,933,783 B1* | 3/2021 | Hamlin | B60N 2/5825 |
| 11,332,056 B2* | 5/2022 | Eldridge | B60N 2/5825 |
| 2002/0063465 A1* | 5/2002 | Pinkos | B60N 2/5825 |
| | | | 297/452.58 |
| 2002/0101109 A1* | 8/2002 | Stiller | B60N 2/5825 |
| | | | 297/452.6 |
| 2005/0110312 A1* | 5/2005 | Pinkos | B60N 2/5825 |
| | | | 297/216.1 |
| 2008/0201914 A1* | 8/2008 | Turner | F16B 5/123 |
| | | | 24/289 |
| 2009/0033131 A1* | 2/2009 | Clauser | B68G 7/052 |
| | | | 297/218.4 |
| 2009/0249587 A1* | 10/2009 | Donahue-Yan | F16B 5/0657 |
| | | | 24/297 |
| 2010/0117434 A1* | 5/2010 | Galbreath | B60N 2/5825 |
| | | | 297/452.58 |
| 2011/0227390 A1* | 9/2011 | Lovasz | B60N 2/5825 |
| | | | 297/452.58 |
| 2011/0309667 A1* | 12/2011 | Stiller | B60N 2/5825 |
| | | | 24/289 |
| 2012/0308332 A1* | 12/2012 | Jackson | B29C 64/124 |
| | | | 470/8 |
| 2014/0068900 A1* | 3/2014 | Lovasz | B68G 7/12 |
| | | | 24/543 |
| 2014/0086704 A1* | 3/2014 | Hemingway | F16B 33/006 |
| | | | 411/378 |
| 2015/0040491 A1* | 2/2015 | Frank | E02D 27/00 |
| | | | 52/157 |
| 2015/0135485 A1* | 5/2015 | Santin | F16B 2/22 |
| | | | 29/453 |
| 2015/0165947 A1* | 6/2015 | Clauser | B60N 2/68 |
| | | | 297/452.18 |
| 2017/0008436 A1* | 1/2017 | Wyatt | B60N 2/5825 |
| 2017/0057807 A1* | 3/2017 | Agonia | B60N 2/5825 |
| 2017/0313023 A1 | 11/2017 | Schoenfelder | |
| 2022/0314854 A1* | 10/2022 | Pereny | B60N 2/7017 |

* cited by examiner

RETENTION CLIP FOR A SEAT ASSEMBLY AND METHOD OF ASSEMBLY

TECHNICAL FIELD

This invention relates to a retention clip, a seat assembly having a retention clip, and a method of assembly.

BACKGROUND

A seat assembly including a cushion and a retention clip is disclosed in U.S. Pat. No. 8,191,971.

SUMMARY

In at least one embodiment, a retention clip for attaching a seat component to a cushion of a seat assembly is provided. The retention clip includes a spiral anchor that spirals around an anchor axis and at least one retention feature for securing the seat component. The retention feature extends away from the spiral anchor.

In at least one embodiment, a seat assembly is provided. The seat assembly has a cushion, a seat component, and a retention clip. The retention clip has a spiral anchor that is screwed into the cushion to secure the retention clip to the cushion and at least one retention feature that engages the seat component to secure the seat component to the retention clip.

In at least one embodiment, a method of assembling a seat assembly is provided. The method includes providing a cushion that is a three-dimensional mesh structure formed of randomly looped and bonded filaments, providing a retention clip having a spiral anchor and at least one retention feature that is adapted to engage a seat component, and screwing the spiral anchor into the three-dimensional mesh structure of the cushion to secure the retention clip to the cushion.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
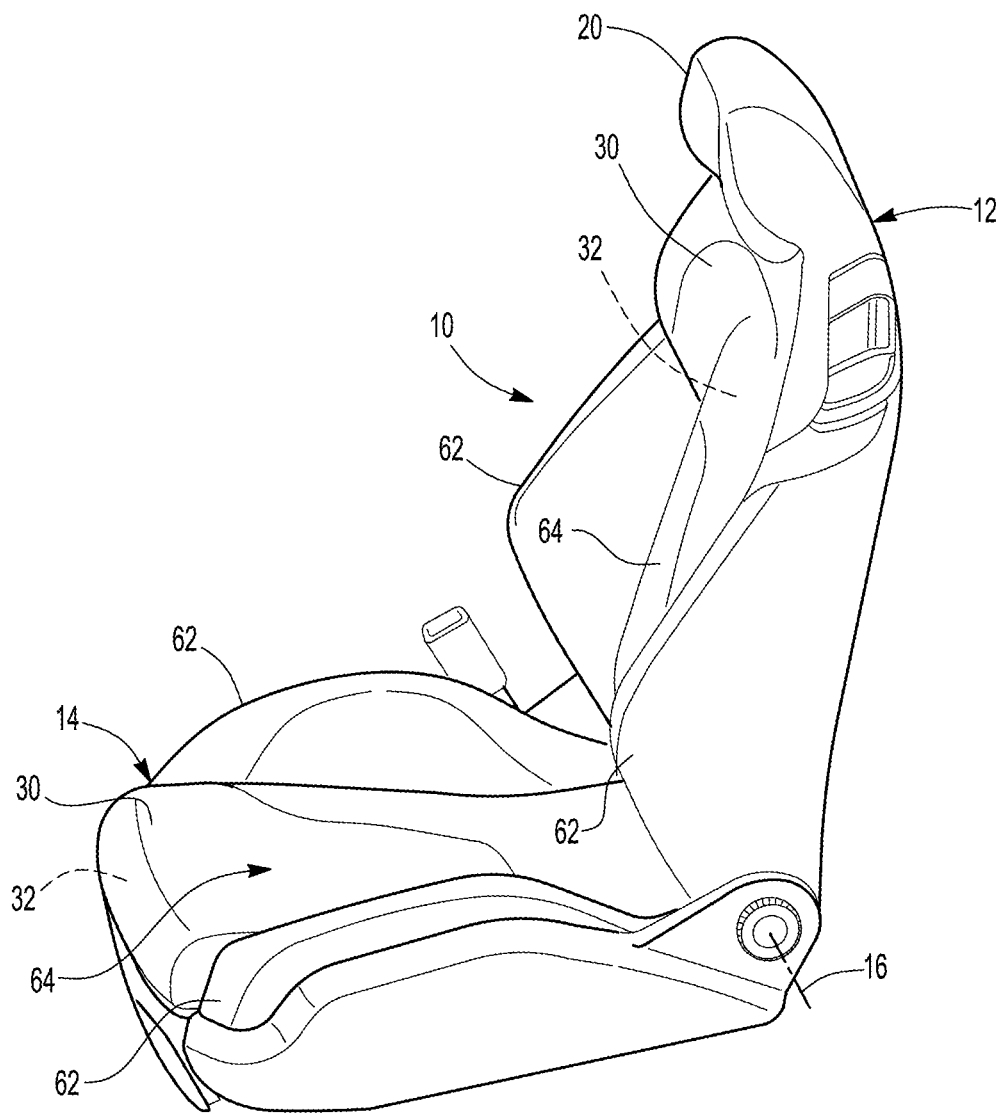
FIG. 1 is a perspective view of an example of a seat assembly.

Referring to FIG. 1, an example of a seat assembly 10 is shown. The seat assembly may be configured for use in a vehicle, such as a motor vehicle like a car or truck. The seat assembly 10 may include a seat back 12 and a seat bottom 14.

The seat back 12 may be configured to support the back of a seat occupant. The seat back 12 may be pivotal about an axis 16 with respect to the seat bottom 14. For example, one or more recliner mechanisms, pivot pins, or the like may pivotally connect the seat back 12 to the seat bottom 14. Alternatively, the seat back 12 or a portion thereof may not be pivotally connected to the seat bottom 14. For instance, the seat back 12 may be pivotally mounted to a vehicle body structure, such as may be the case in some bench seat configurations.

The seat back 12 may include a head restraint 20 that may be configured to support the head of a seat occupant. The head restraint 20 may be disposed at the top of the seat back 12. The head restraint 20 may be unitary with the seat back 12 or may be a separate component that is adjustably positionable with respect to the top of the seat back 12.

The seat bottom 14 may be configured to support a seat occupant. In a vehicular application, the seat bottom 14 may be mounted to a support surface, such as a vehicle floor.

The seat back 12 and the seat bottom 14 may each have at least one seat component and a cushion 32. The seat component 30 may be secured to the cushion 32 with one or more retention clips 34 as will be discussed in more detail below.

The seat component 30 may be disposed over or upon the cushion 32. The seat component 30 may have any suitable configuration and be of any suitable type. For instance, the seat component 30 may be a trim cover assembly that provides at least a portion of a visible exterior surface of the seat assembly 10. The trim cover assembly 30 may include a plurality of trim panels that may be assembled in any suitable manner, such as by stitching. The trim panels may be made of any suitable material or materials, such as fabric, leather, vinyl, or combinations thereof. The seat component 30 may also be a component that is concealed by or disposed under a trim cover assembly 30 and is disposed on the cushion 32, such as a temperature adjusting device like a heating pad or heating mat, an inflatable device for enhancing comfort of a seat occupant like a lumbar support or that provide massage functionality, an air-permeable material that facilitates airflow for a ventilated seat, or the like.

Figure 3:
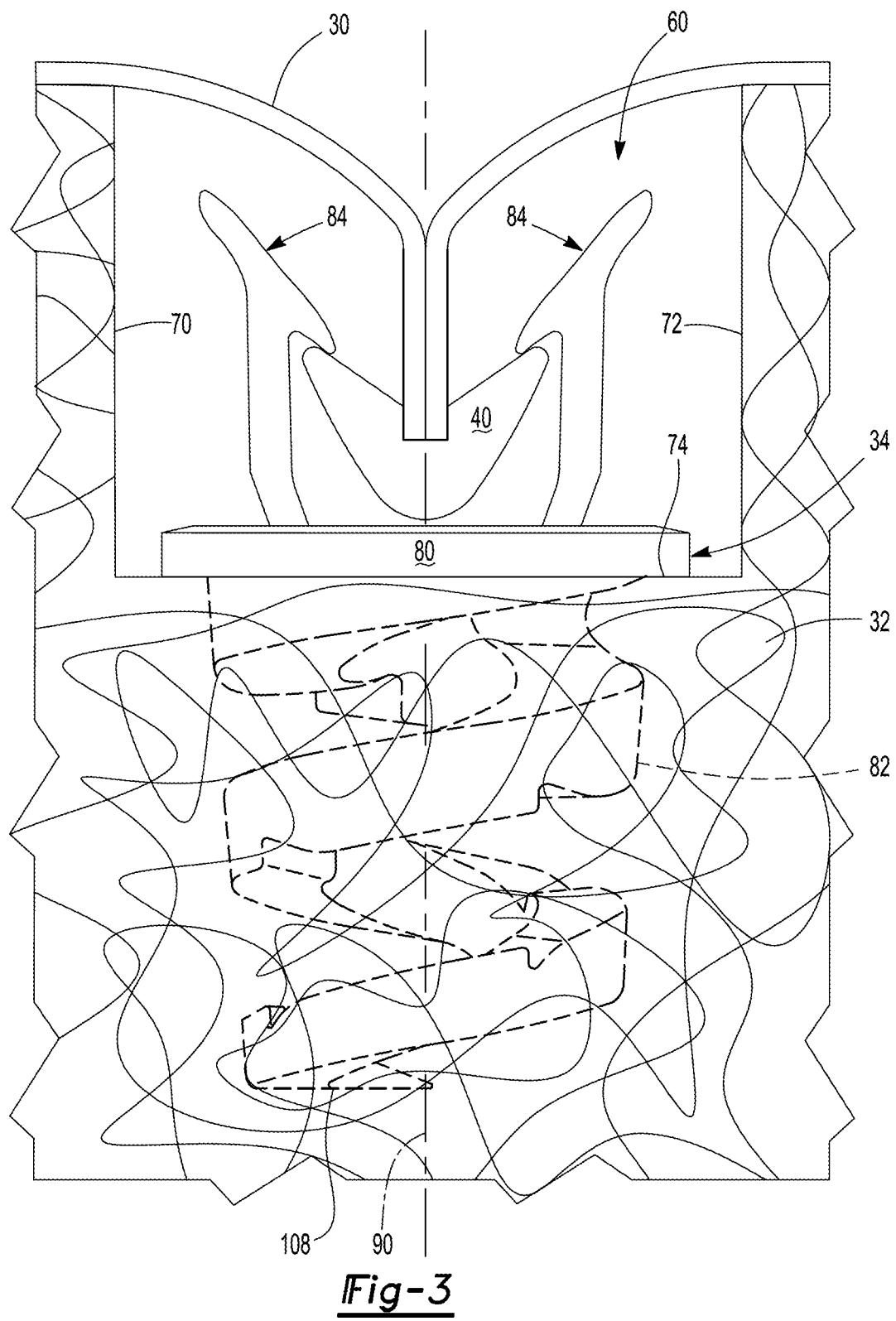
FIG. 3 is a fragmentary side view of a portion of the seat assembly showing the retention clip mounted to a cushion and an example of a seat component mounted to the retention clip.

Referring to FIG. 3, the seat component 30 may also include at least one engagement feature 40. The engagement feature 40 may help secure the seat component 30 to a retention clip 34 to hold the trim cover assembly 30 in a desired position. In addition, the engagement feature 40 may help secure the seat component 30 to inhibit folding, puckering, or wrinkling of the seat component 30, which may have an undesirable aesthetic appearance. The engagement feature 40 may have any suitable configuration, such as a male configuration, female configuration, or combinations thereof. As some examples, an engagement feature 40 may be configured as or may be provided with a hook, hole, barb, linkage, loop, or the like or may be provided as a portion of a hook and loop fastener like Velcro®. The engagement feature 40 may be provided in any suitable location. For example, the engagement feature 40 may be provided proximate an end or edge of one or more trim cover panels. Alternatively or in addition, the engagement feature 40 may include a panel, web, or other intermediate component that interconnects the engagement feature to one or more trim cover panels. The engagement feature 40 may be coupled to the seat component 30 in any suitable manner, such as with stitching, a mechanical fastener, molding, bonding, or an adhesive. Moreover, the engagement feature 40 may be made of any suitable material, such as a polymeric material.

Figure 6:
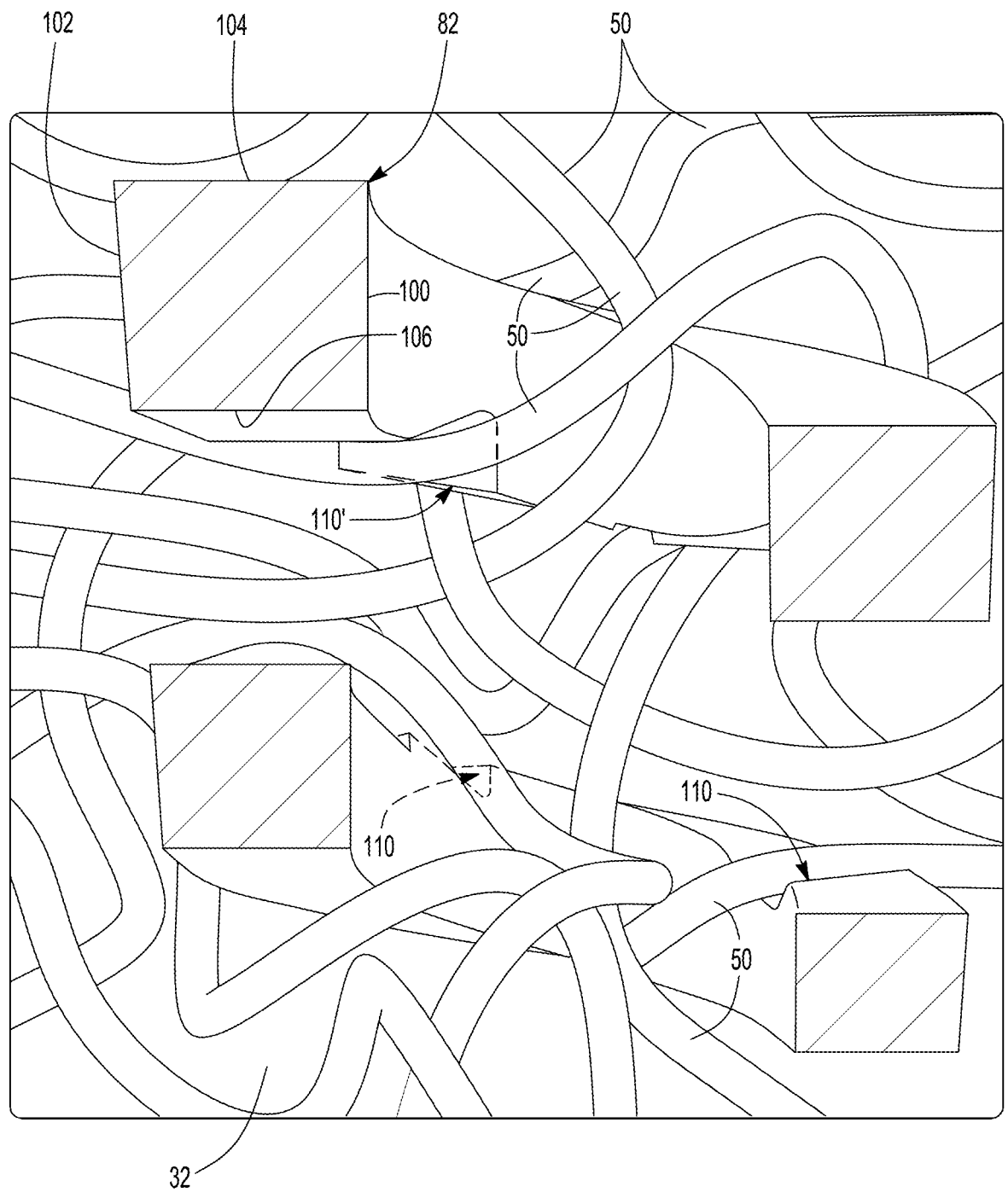
FIG. 6 is magnified view of a portion of FIG. 5 showing the retention clip mounted to the cushion.

The cushion 32 may be at least partially concealed by the seat component 30 and may be directly or indirectly supported by a support structure of the seat assembly 10, such as a frame, panel, support wires, or the like. The cushion 32 includes a three-dimensional mesh structure formed of randomly looped and bonded filaments 50, examples of which are best shown in FIG. 6. (In FIG. 3, filaments are pictorially represented by randomly drawn lines for simplicity.) For example, the filaments 50 may be extruded filaments that are made of a polymeric material, such as a thermoplastic resin that is polyamide based, polyester based, polyimide based, polyolefin based, polypropylene based, polystyrene based, or combinations thereof. As one example, filaments 50 may be made of linear low density polyethylene (LLDPE). The extruded filaments 50 may be randomly looped, curled, or entangled and may be bonded together where one filament 50 contacts another, thereby resulting in a lightweight, air permeable cushion having openings or voids between the filaments 50. A method of making an extruded filament mesh cushion is disclosed in U.S. patent application Ser. No. 17/555,875, which is hereby incorporated by reference in its entirety. As such, the cushion 32 may not be made of foam, such as urethane foam, and may partially or completely replace a conventional urethane foam cushion. In at least one configuration, the cushion 32 may include one or more cushion recesses 60, such as is shown in FIG. 3.

A cushion recess 60 may be a recess, such as an elongated channel, hole, indentation, or trench that is provided in the cushion 32. A cushion recess 60 may be provided in any suitable location. For instance, a cushion recess 60 may be provided in a side of the cushion 32 that faces toward a seat occupant. As some further examples, a cushion recess 60 may be provided where a side bolster 62 meets a center seating portion 64 of the cushion 32, a cushion recess 60 may across the center seating portion 64 such as from front to back or side to side, or combinations thereof. Cushion recesses 60 may be spaced apart from each other or may intersect. In at least one configuration, a cushion recess 60 may be at least partially defined by one or more surfaces. For instance, the cushion recess 60 may be at least partially defined by at least one side surface, such as first and second side surfaces 72, and a bottom surface 74. In the configuration shown in FIG. 3, the bottom surface 74 may extend between the first and second side surfaces 70, 72.

Figure 2:
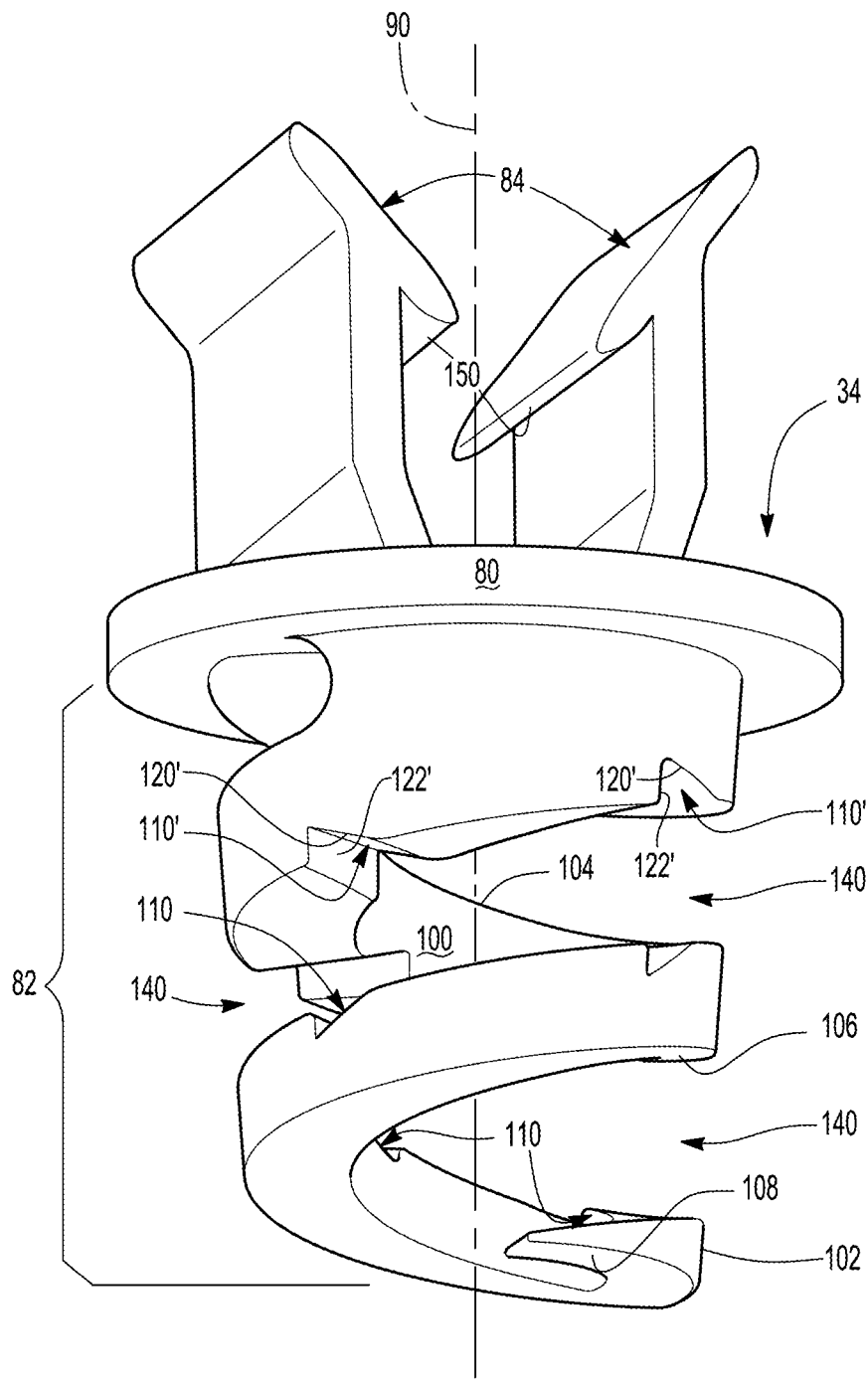
FIG. 2 is a perspective view of an example of a retention clip.
Figure 4:
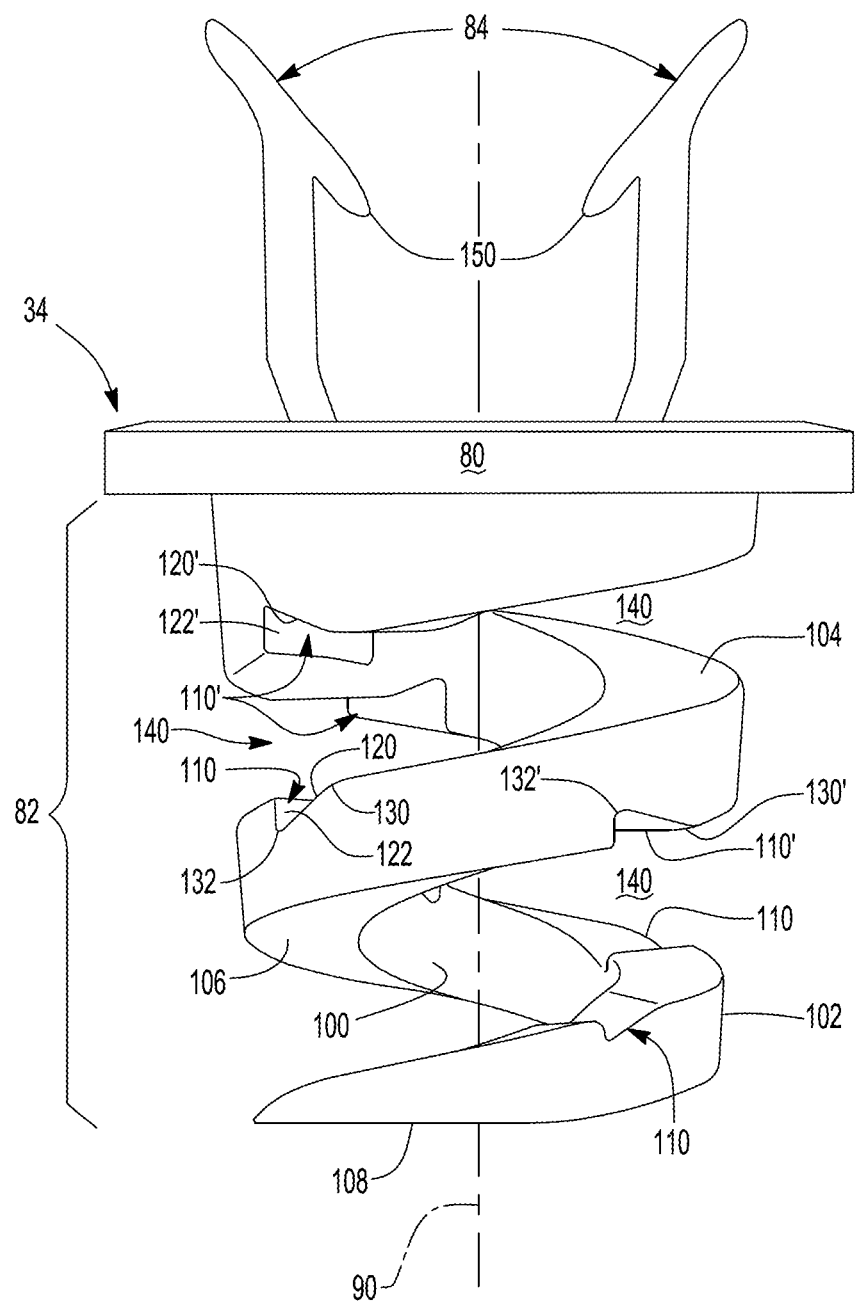
FIG. 4 is a side view of the retention clip from an opposite side from that shown in FIG. 3.

Referring to FIGS. 2-4, one or more retention clips 34 may be provided to secure the seat component 30 to the cushion 32. More specifically, a retention clip 34 may be configured to engage one or more engagement features 40 of the seat component 30 to provide localized retention of the seat component 30. The retention clip 34 may be partially disposed in the cushion 32. In addition, the retention clip 34 may be at least partially disposed in the cushion recess 60 as will be discussed in more detail below. In at least one configuration, the retention clip 34 may include a base 80, a spiral anchor 82, and at least one retention feature 84.

The base 80 may be disposed between the spiral anchor 82 and the retention feature 84. In at least one configuration, the base 80 may be configured as a panel, plate, or disc that may be received in the cushion recess 60. The base 80 may rest on the bottom surface 74 of the cushion recess 60.

The spiral anchor 82 may facilitate mounting of the retention clip 34 to the cushion 32. The spiral anchor 82 may extend from the base 80 in a direction that extends away from the retention feature 84. In addition, the spiral anchor 82 may be integrally formed with the base 80 or may be provided as a separate component that is attached to the base 80. The spiral anchor 82 may spiral around an anchor axis 90 and may be spaced apart from the anchor axis 90. The base 80 may extend further away from the anchor axis 90 than the spiral anchor 82. For instance, the base 80 may extend outwardly or radially away from the anchor axis 90 further than the spiral anchor 82 extends outwardly or radially away from the anchor axis 90.

Figure 5:
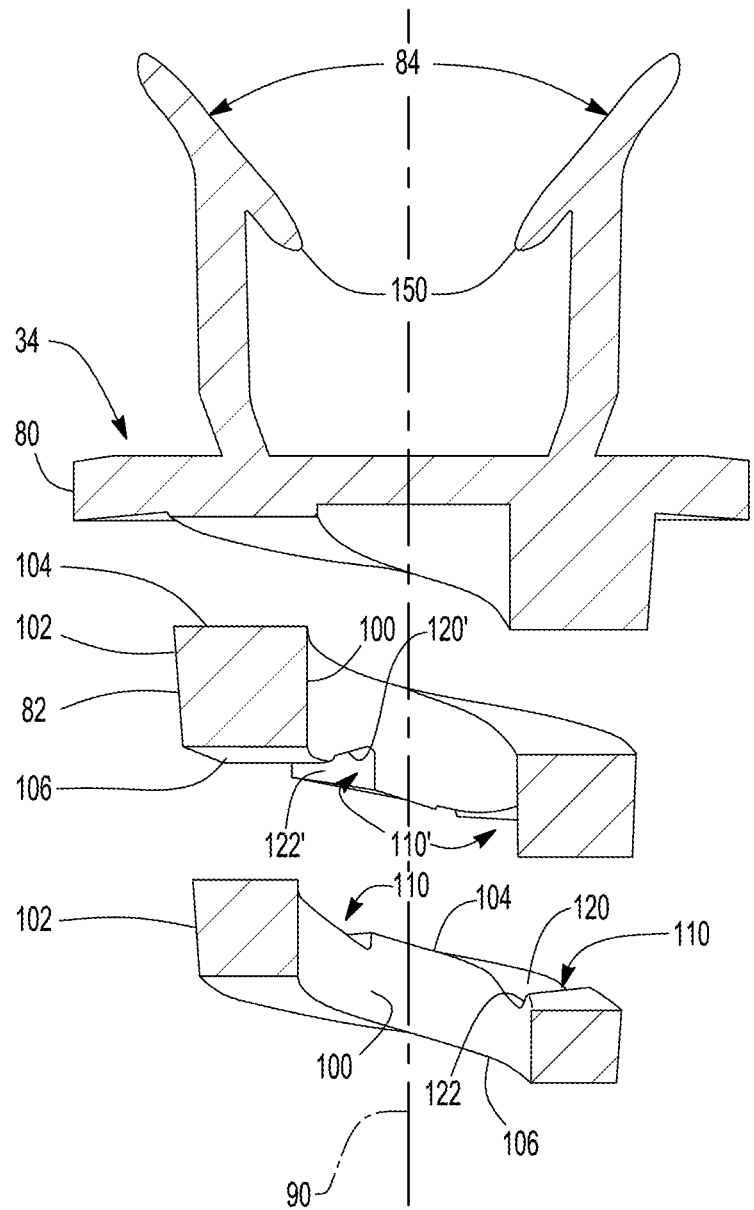
FIG. 5 is a section view of the retention clip shown in FIG. 4 along an anchor axis of the retention clip.

In at least one configuration, the spiral anchor 82 may have a non-circular cross section, an example of which is shown in FIG. 5. A non-circular cross section or a cross section that differs from that of the filaments 50 of the cushion 32 may allow the spiral anchor 82 to better grip the cushion 32 when installed. In the configuration shown in FIG. 5, the spiral anchor 82 has a four sided or quadrilateral cross section; however, it is contemplated that other cross sectional configurations may be provided that may have a greater or lesser number of sides. In a four-sided configuration, the spiral anchor 82 may include an inner side 100, an outer side 102, an upper side 104, and a lower side 106. These sides may spiral around the anchor axis 90 and away from the base and thus extend progressively further from the base 80 as the sides extend toward the distal end of the spiral anchor 82. The spiral anchor 82 may also include an end surface 108, which is best shown in FIGS. 2 and 4.

Referring primarily to FIGS. 4 and 5, the inner side 100 may face toward the anchor axis 90. In addition, the inner side may be spaced apart from the anchor axis 90 and may be disposed closer to the anchor axis 90 than the outer side 102.

The outer side 102 may be disposed opposite the inner side 100. As such, the outer side 102 may face away from the anchor axis 90.

The upper side 104 may face toward the base 80. In addition, the upper side 104 may extend between the inner side 100 and the outer side 102, such as from the inner side 100 to the outer side 102. The upper side 104 may be interrupted by one or more notches 110 and may be discontinuous as will be discussed in more detail below The lower side 106 may be disposed opposite the upper side 104. As such, the lower side 106 may face away from the base 80. The lower side 106 may extend between the inner side 100 and the outer side 102, such as from the inner side 100 to the outer side 102. The lower side 106 may be interrupted by one or more notches 110' and may be discontinuous as will be discussed in more detail below.

Referring to FIG. 4, the end surface 108 may extend between the inner side 100 and the outer side 102 and may extend between the upper side 104 and the lower side 106. In at least one configuration, the end surface 108 may be disposed substantially parallel to the base 80, substantially perpendicular to the anchor axis 90, or both. The term "substantially parallel" as used herein means the same as or very close to parallel and includes features or axes that are within ±2.5° of being parallel each other. The term "substantially perpendicular" is used herein to designate features or axes that are the same as or very close to perpendicular and includes features that are within ±2° of being perpendicular each other. The end surface 108 may be disposed inside the three-dimensional mesh structure of the cushion 32 when the retention clip 34 is installed as shown in FIG. 3.

Referring to FIG. 5, the cross-sectional area of the spiral anchor 82 may change as the spiral anchor 82 extends away from the base 80. For instance, the cross-sectional area of the spiral anchor 82 may be greater at a first end of the spiral anchor 82 as compared to a second end of the spiral anchor 82. The first end of the spiral anchor 82 may be disposed adjacent to the base 80. The second end of the spiral anchor 82 may be disposed opposite the first end and may be a distal end or free end of the spiral anchor 82. In the configuration shown in FIG. 5, the cross-sectional area of the spiral anchor 82 progressively decreases as the spiral anchor 82 extends away from the base 80 or as the spiral anchor 82 extends from first end to the second end, notwithstanding any notches 110, 110' that may be provided with the spiral anchor 82.

Referring to FIGS. 2 and 4-6, the spiral anchor 82 may include one or more notches 110, 110'. A notch 110, 110' may be configured to receive a filament 50 of the cushion 32 to help secure the retention clip 34 to the cushion 32 and resist loosening of the retention clip 34 after installation. For instance, a filament 50 may be received in a notch 110, 110' to resist or inhibit rotation of the retention clip 34 about the anchor axis 90. A notch 110, 110' may reduce the cross-sectional area of the spiral anchor 82. In at least one configuration, the spiral anchor 82 may include a first set of notches 110, a second set of notches 110', or both.

Referring primarily to FIGS. 2, 4, and 5, the first set of notches 110 may be formed in the upper side 104 of the spiral anchor 82. As such, a member of the first set of notches 110 may extend in a direction that extends away from the base 80 and the retention feature 84. Members of the first set of notches 110 may extend between the inner side 100 and the outer side 102. For instance, a member of the first set of notches 110 may extend from the inner side 100 toward the outer side 102, from the outer side 102 toward the inner side 100, or from the inner side 100 to the outer side 102. Members of the first set of notches 110 may be spaced apart from each other. A member of the first set of notches 110 may have any suitable shape. In the configuration shown, each notch 110 has a generally two-sided configuration that includes a ramp surface 120 and a step surface 122.

The ramp surface 120 of a notch 110 may extend from the upper side 104 in a direction that extends away from the base 80 or parallel to the base 80. For instance, a first end 130 of the ramp surface 120 may intersect the upper side 104 while a second end 132 of the ramp surface 120 that is disposed opposite the first end 130 may be disposed further from the base 80 than the first end 130. The ramp surface 120 may extend laterally from the inner side 100, the outer side 102, or both.

The step surface 122 may extend from the second end 132 of the ramp surface 120 in a direction that extends toward the base 80. As such, the step surface 122 may extend from the second end 132 of the ramp surface 120 to the upper side 104. The step surface 122 may extend laterally from the inner side 100, the outer side 102, or both. In at least one configuration, the step surface 122 may have a generally vertical orientation that may extend substantially parallel to the anchor axis 90.

The second set of notches 110' may be formed in the lower side 106 of the spiral anchor 82. As such, a member of the second set of notches 110' may extend in a direction that extends toward the base 80 and the retention feature 84. Members of the second set of notches 110' may extend between the inner side 100 and the outer side 102. For instance, a member of the second set of notches 110' may extend from the inner side 100 toward the outer side 102, from the outer side 102 toward the inner side 100, or from the inner side 100 to the outer side 102. Members of the second set of notches 110' may be spaced apart from each other. A member of the second set of notches 110' may have any suitable shape. In the configuration shown, each notch 110' has a generally two-sided configuration that includes a ramp surface 120' and a step surface 122'.

The ramp surface 120' of a notch 110' may extend from the lower side 106 in a direction that extends toward the base 80 or parallel to the base 80. For instance, a first end 130' of the ramp surface 120' may intersect the lower side 106 while a second end 132' of the ramp surface 120' that is disposed opposite the first end 130' may be disposed closer to the base 80 than the first end 130'. The ramp surface 120' may extend laterally from the inner side 100, the outer side 102, or both.

The step surface 122' may extend from the second end 132' of the ramp surface 120' in a direction that extends away from the base 80. As such, the step surface 122' may extend from the second end 132' of the ramp surface 120' to the lower side 106. The step surface 122' may extend laterally from the inner side 100, the outer side 102, or both. In at least one configuration, the step surface 122' may have a generally vertical orientation that may extend generally parallel to the anchor axis 90.

Referring to FIG. 4, a member of the first set of notches 110 may or may not be aligned with a member of the second set of notches 110'. In the configuration shown in FIG. 4, a member of the first set of notches 110 is aligned with and disposed directly opposite a member of the second set of notches 110' such that a gap 140 is provided therebetween. Such a configuration may position a pair of notches 110, 110' such that the notches 110, 110' may extend away from each other to increase the effective size of the gap 140 available for receiving filaments 50. In addition, notches 110, 110' may be arranged such that the notches 110, 110' are not disposed directly opposite each other such that a notch 110 extends from the upper side 104 toward an opposing notch 110' that extends from the lower side 106, thereby avoiding a reduction in the cross-sectional area of the spiral anchor 82 from both the upper side 104 and the lower side 106 that could weaken the spiral anchor 82.

Referring to FIGS. 2 and 3, one or more retention features 84 may be provided to engage and secure the seat component 30. A retention feature 84 may extend from the base 80 in a direction that extends away from the spiral anchor 82. As such, the retention feature 84 and the spiral anchor 82 may be disposed on opposite sides of the base 80. The retention feature 84 may have any suitable configuration. For instance, the retention feature 84 may have a male configuration, a female configuration, or combinations thereof. As some examples, a retention feature 84 may be configured as or may be provided with a hook, hole, barb, linkage, loop, or the like or may be provided as a portion of a hook and loop fastener like Velcro®. In the embodiment shown, the retention feature 84 is configured as a pair of spaced apart barbs 150 that extend from the base 80. The barbs 150 may be configured to flex away from each other to receive the seat component 30 and/or engagement feature 40 in a snap-fit arrangement. As is best shown in FIG. 3, the retention feature 84 may extend into the cushion recess 60.

The cushion 32 and retention clip 34 may be manufactured as separate components and then subsequently assembled. The retention clip 34 may be installed as described below.

First the retention clip 34 may be aligned with a desired installation position on the cushion 32. The desired installation position may be the cushion recess 60. The retention clip 34 may be oriented so that the spiral anchor 82 extends toward the cushion 32.

Next, the retention clip 34 may be engaged with the cushion 32. For instance, the distal end or end surface 108 of the spiral anchor 82 may engage a portion of the cushion 32, such as the bottom surface 74 of the cushion recess 60.

Next, the retention clip 34 may then be rotated about the anchor axis 90 while being advanced into the cushion 32, thereby screwing the spiral anchor 82 into the three-dimensional mesh structure of the cushion 32 to secure the retention clip 34 to the cushion 32 without bonding the retention clip 34 to the cushion 32. Filaments 50 of the cushion 32 may be captured in the gap 140 formed by the spiral anchor 82, captured in one or more notches 110, 110', or both. In addition, the spiral anchor 82 may push or bend filaments 50 as it is rotated, which in turn may help retain the spiral anchor 82 in the cushion 32. Rotation may continue until the base 80 contacts the bottom surface 74, until the retention feature 84 is positioned in a desired orientation, or both.

Next, the seat component 30 may be mounted to the retention feature 84 to secure the seat component 30 to the retention clip 34. For instance, the engagement feature 40 of the seat component 30 may be engaged with or coupled to the retention feature 84 of the retention clip 34 to secure the seat component 30. The seat component 30 may be mounted to the retention feature 84 after screwing the spiral anchor 82 into the three-dimensional mesh structure of the cushion to avoid twisting of the seat component 30.

A retention clip as described above may secure a seat component to an extruded filament mesh cushion by screwing the retention clip into the cushion so that the spiral anchor can catch or engage filaments in a manner that anchors the retention clip. As such, the spiral anchor may engage and pass between filaments as it is screwed into the cushion without tearing or severing the filaments and thus without weakening the cushion. The spiral anchor may be provided with a cross sectional profile and notches that may engage filaments in a manner that makes the retention clip difficult to remove or rotate once installed. In addition, the retention clip may be provided with any suitable retention feature that is compatible with an engagement feature on the seat component, thereby facilitating multiple retention clip designs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A retention clip for attaching a seat component to a cushion of a seat assembly, the retention clip comprising:
    a spiral anchor that spirals around an anchor axis; and
    at least one retention feature for securing the seat component that extends away from the spiral anchor, wherein the retention clip includes a base, the spiral anchor and the retention feature extend from opposite sides of the base, and the spiral anchor includes a first set of notches that are formed in an upper side of the spiral anchor that faces toward the retention feature such that the notches extend away from the retention feature.

2. The retention clip of claim 1 wherein the spiral anchor is spaced apart from and does not intersect the anchor axis.

3. The retention clip of claim 2 wherein the base extends further away from the anchor axis than the spiral anchor.

4. The retention clip of claim 1 wherein the spiral anchor is spaced apart from the anchor axis.

5. The retention clip of claim 1 wherein the spiral anchor further comprises a non-circular cross section.

6. The retention clip of claim 1 wherein the spiral anchor further comprises a quadrilateral cross section.

7. The retention clip of claim 1 wherein a cross-sectional area of the spiral anchor changes from a first end of the spiral anchor to a second end.

8. The retention clip of claim 1 wherein members of the first set of notches reduce a cross-sectional area of the spiral anchor.

9. The retention clip of claim 1 wherein the spiral anchor further comprises an inner side that faces toward the anchor axis and an outer side that is disposed opposite the inner side, wherein members of the first set of notches extend from the inner side to the outer side.

10. A retention clip for attaching a seat component to a cushion of a seat assembly, the retention clip comprising:
    a spiral anchor that spirals around an anchor axis; and
    at least one retention feature for securing the seat component that extends away from the spiral anchor, wherein the retention clip includes a base, the spiral anchor and the retention feature extend from opposite sides of the base, and the spiral anchor includes a second set of notches that are formed in a lower side of the spiral anchor that faces away from the retention feature such that the notches extend toward the retention feature.

11. The retention clip of claim 10 wherein the spiral anchor further comprises an inner side that faces toward the anchor axis and an outer side that is disposed opposite the inner side, wherein members of the second set of notches extend from the inner side to the outer side.

12. The retention clip of claim 1 wherein the spiral anchor further comprises a second set of notches, wherein a member of the first set of notches is disposed directly opposite a member of the second set of notches.

13. A seat assembly comprising:
    a cushion;
    a seat component; and
    a retention clip comprising a spiral anchor that is screwed into the cushion to secure the retention clip to the cushion and at least one retention feature that engages the seat component to secure the seat component to the retention clip, wherein the spiral anchor further comprises a notch that is remotely positioned from a free end of the spiral anchor and does not extend from the free end.

14. The seat assembly of claim 13 wherein the cushion is a three-dimensional mesh structure formed of randomly looped and bonded filaments.

15. The seat assembly of claim 14 wherein the notch is configured to receive a filament of the cushion.

16. The seat assembly of claim 14 wherein the retention clip includes a base, the spiral anchor and the retention feature are disposed on opposite sides of the base, and the spiral anchor further comprises an end surface that is disposed substantially parallel to the base and that is disposed inside the three-dimensional mesh structure.

17. A method of assembling a seat assembly comprising:
    screwing a spiral anchor of a retention clip into a cushion that is a three-dimensional mesh structure formed of randomly looped and bonded filaments, the retention clip further comprising at least one retention feature that is adapted to engage a seat component, wherein the spiral anchor further comprises first and second notches that are remotely positioned from a free end of the spiral anchor and do not extend from the free end, wherein the first and second notches receive different filaments of the three-dimensional mesh structure of the cushion and secure the retention clip to the different filaments.

18. The method of claim 17 further comprising mounting the seat component to the retention feature to secure the seat component to the retention clip.

19. The method of claim 18 wherein the seat component is mounted to the retention feature after screwing the spiral anchor into the three-dimensional mesh structure.

* * * * *